(12) United States Patent
Kim et al.

(10) Patent No.: US 8,492,035 B2
(45) Date of Patent: Jul. 23, 2013

(54) POLYMER COMPOSITION FOR RECHARGEABLE LITHIUM BATTERY, METHOD OF PREPARING SAME, AND RECHARGEABLE LITHIUM BATTERY INCLUDING SAME

(75) Inventors: Tae-Keun Kim, Yongin-si (KR); Sae-Weon Roh, Yongin-si (KR); Sang-Woog Ryu, Yongin-si (KR)

(73) Assignee: Samsung SDI Co., Ltd., Gonse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 12/850,435

(22) Filed: Aug. 4, 2010

(65) Prior Publication Data
US 2011/0117442 A1    May 19, 2011

(30) Foreign Application Priority Data

Nov. 17, 2009    (KR) .................. 10-2009-0111105

(51) Int. Cl.
*H01M 10/056*    (2010.01)
(52) U.S. Cl.
USPC .................... 429/317; 429/314; 429/322
(58) Field of Classification Search
USPC .......................... 429/314, 317, 322
See application file for complete search history.

(56) References Cited

U.S. PATENT DOCUMENTS

| | | | |
|---|---|---|---|
| 4,654,279 A * | 3/1987 | Bauer et al. | 429/312 |
| 5,350,646 A * | 9/1994 | Armand et al. | 429/312 |
| 5,523,180 A * | 6/1996 | Armand et al. | 429/188 |
| 6,001,509 A | 12/1999 | Kim et al. | |
| 6,096,453 A * | 8/2000 | Grunwald | 429/212 |
| 6,268,087 B1 | 7/2001 | Kim et al. | |
| 2002/0055039 A1* | 5/2002 | Seung et al. | 429/213 |
| 2006/0251965 A1* | 11/2006 | Nagayama et al. | 429/209 |
| 2008/0076021 A1* | 3/2008 | Takahashi | 429/163 |
| 2010/0255383 A1* | 10/2010 | Kofinas et al. | 429/317 |

FOREIGN PATENT DOCUMENTS

| | | | |
|---|---|---|---|
| JP | 62029076 A | * | 2/1987 |
| JP | 07-320782 | | 12/1995 |
| JP | 10-233339 | | 9/1998 |
| JP | 11111338 | | 4/1999 |
| KR | 100231682 | | 8/1999 |
| KR | 10-2003-0086664 | | 11/2003 |
| KR | 10-2005-0024921 | | 3/2005 |

OTHER PUBLICATIONS

IPDL Machine Translation of JP 07-320782A Dec. 1995.*
Linden "Handbook of Batteries" 3rd edition, McGraw-Hill Inc, 2002, pp. 34.1, 34.36 and 34.37.*
Ghosh et al., "Nanostructured Block Copolymer Dry Electrolyte", J. of Electrochemical Society, 155 (6) A428-A432, 2008.*
Takeshi Niitani et al., "Characteristics of new-type solid polymer electrolyte controlling nano-structure", Journal of Power Sources 146 (2005) 386-390.
Korean Office Action issued by KIPO, dated Jun. 1, 2011, corresponding to Korean Patent Application No. 10-2009-0111105, together with Request for Entry.

* cited by examiner

*Primary Examiner* — Gregg Cantelmo
(74) *Attorney, Agent, or Firm* — Robert E. Bushnell, Esq.

(57) ABSTRACT

A polymer composition for a rechargeable lithium battery including a polymer of a first monomer selected from methylmethacrylate (MMA), acrylonitrile (AN), or a combination thereof, and a second monomer of ethylene oxide (EO), as well as a lithium salt.

10 Claims, 7 Drawing Sheets

POLYMER COMPOSITION FOR RECHARGEABLE LITHIUM BATTERY, METHOD OF PREPARING SAME, AND RECHARGEABLE LITHIUM BATTERY INCLUDING SAME

RELATED APPLICATIONS

This application claims priority to and the benefit of Korean Patent Application No. 10-2009-0111105 filed in the Korean Intellectual Property Office on Nov. 17, 2009, the entire contents of which are incorporated herein by reference.

BACKGROUND

1. Field

This disclosure relates to a polymer composition for a rechargeable lithium battery, a method of manufacturing the same, and a rechargeable lithium battery including the same.

2. Description of the Related Art

A battery is a device for converting chemical energy generated during an electrochemical oxidation and reduction reaction of chemical materials to electrical energy, and it may be classified into a primary battery that cannot be recharged when all energy in the battery is consumed, and a rechargeable battery that can be repeatedly charged. The rechargeable battery is repeatedly charged and discharged using reversible conversion of chemical energy and electrical energy.

On the other hand, it is possible to achieve a smaller and lighter electronic device, so portable electronic devices are widely used. Therefore, as a power source of the portable electronic device, a battery is required to have high energy density, and research on rechargeable lithium batteries is being actively advanced.

The rechargeable lithium battery includes a positive electrode, a negative electrode, and an electrolyte, and the electrolyte may be broadly classified into a liquid electrolyte and a polymer electrolyte. A rechargeable lithium battery including a polymer electrolyte is superior to that including a liquid electrolyte in the view of safety.

SUMMARY

One aspect of this disclosure provides a polymer composition for a rechargeable lithium battery having room temperature ion conductivity.

Another aspect of this disclosure provides a method of manufacturing the polymer composition for a rechargeable lithium battery.

A further aspect of this disclosure provides a rechargeable lithium battery including the polymer composition for a rechargeable lithium battery.

According to one aspect of this disclosure, a polymer composition for a rechargeable lithium battery includes: a polymer of a first monomer selected from methylmethacrylate (MMA), acrylonitrile (AN), or a combination thereof, and a second monomer of ethylene oxide (ECO); and a lithium salt.

The first monomer may be methylmethacrylate having no aromatic group, acrylonitrile having no aromatic group, or a combination thereof The polymer includes a methylmethacrylate-ethylene oxide (MMA-EO) copolymer including about 31 wt % to about 54 wt % of methylmethacrylate based on the total weight of the copolymer.

The polymer includes an acrylonitrile-ethylene oxide (AN-EO) copolymer including about 11 wt % to about 20 wt % of acrylonitrile based on the total weight of the copolymer.

The polymer includes a terpolymer including methylmethacrylate-acrylonitrile-ethylene oxide, and the total amount of the methylmethacrylate and acrylonitrile may be about 5 to about 25 wt % of the methylmethacrylate and acrylonitrile based on the total weight of the terpolymer.

The polymer composition includes ethylene oxide (EO) and lithium (Li) at a mole ratio of about 1:1 to about 20:1. In one embodiment, the polymer composition includes ethylene oxide (EO) and lithium (Li) at a mole ratio of about 3:1 to about 6:1.

The polymer composition has room temperature ion conductivity of about $1 \times 10^{-7}$ S/cm to about $1.7 \times 10^{-4}$ S/cm.

The lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_yF_{2x+1}SO_2)(C_yF_{2y+1}SO_2)$ (where x and y are natural numbers), LiCl, LiI, or a combination thereof.

The polymer composition may be used for a binder for a negative active material or a binder for a positive active material for a rechargeable lithium battery. In addition, the polymer composition may be used for an electrolyte for a rechargeable lithium battery.

According to another embodiment of this disclosure, a method of preparing a polymer composition for a rechargeable lithium battery is provided that includes polymerizing a first monomer selected from methylmethacrylate (MMA), acrylonitrile (AN), or a combination thereof, and a second monomer of ethylene oxide in accordance with radical polymerization to provide a polymer, and adding a lithium salt to the resultant polymer.

According to further another embodiment of this disclosure, a rechargeable lithium battery includes: a positive electrode including a positive active material and a first binder; a negative electrode including a negative active material and a second binder; and a polymer electrolyte, wherein at least one of the first binder, the second binder, and the polymer electrolyte includes the polymer composition according to one embodiment of this disclosure.

It is possible to provide a polymer composition that is capable of providing an active material binder and an electrolyte for a rechargeable lithium battery that is electrochemically stable, is easily mass-produced, and has a long cycle-life.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

In FIG. 2, "PAN-PEO 1100" stands for an acrylonitrile (AN)-ethylene oxide (EO) copolymer; and "EC/DEC" stands for ethyl carbonate/diethyl carbonate.

DETAILED DESCRIPTION

Figure 1:
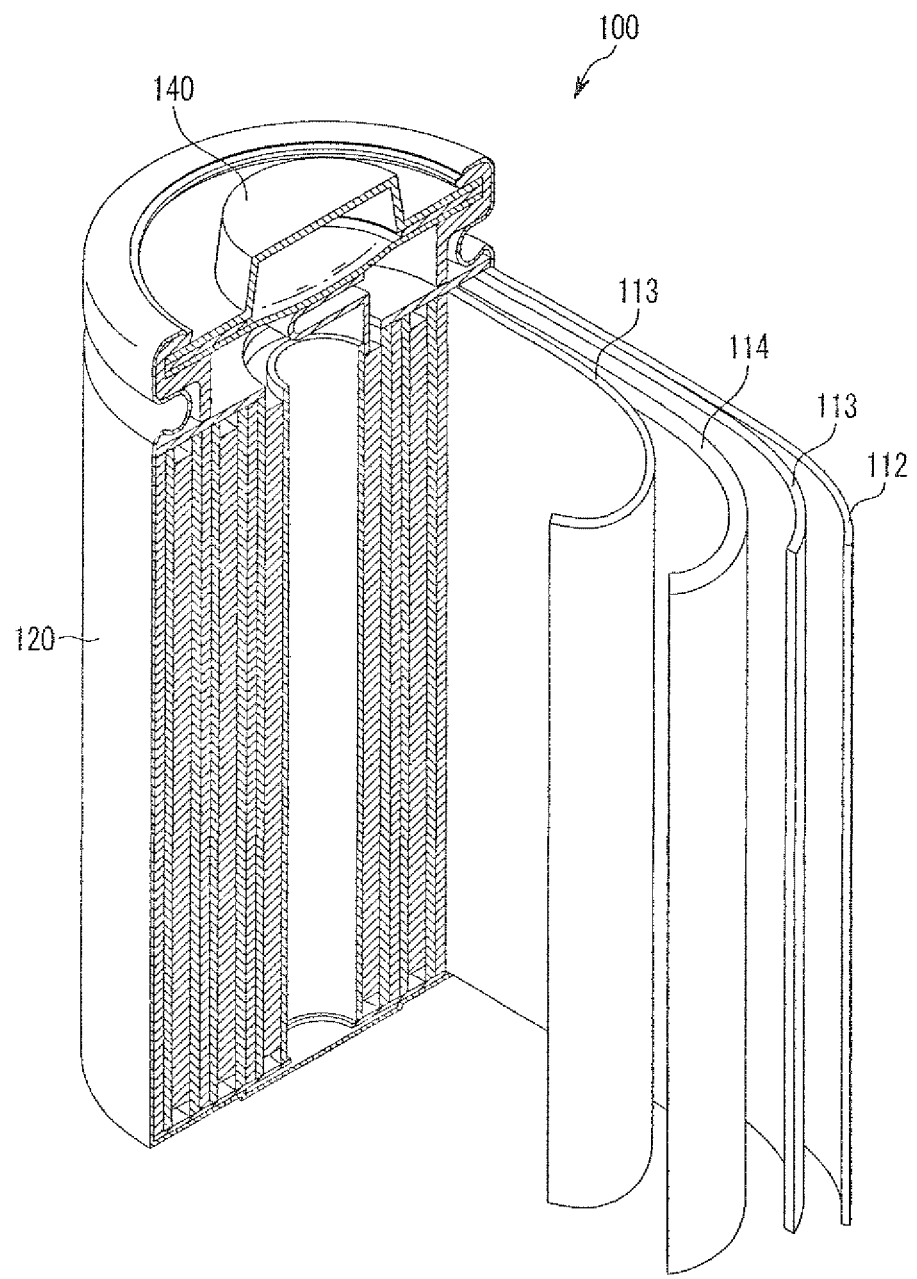
FIG. 1 is a schematic view of a structure of a rechargeable lithium battery according to one embodiment.

This disclosure will be described more fully hereinafter with reference to the accompanying drawings, in which exemplary embodiments of this disclosure are shown.

The polymer composition for a rechargeable lithium battery according to one embodiment includes a polymer of a first monomer selected from methylmethacrylate (MMA), acrylonitrile (AN), or a combination thereof, and a second monomer of ethylene oxide (EO), as well as a lithium salt.

According to an embodiment of the invention, the copolymer may be a statistical copolymer, a block copolymer, or an alternating copolymer.

The first monomer may be selected from acrylonitrile having no aromatic group, methylmethacrylate having no aromatic group, or a combination thereof.

The physical phases of ethylene oxide polymer (polyethylene oxide, PEO) is changed, depending upon the molecular weight, but is generally a crystalline polymer. Since the ethylene oxide polymer has a waxy characteristic (high molecular weight) or fluid liquid characteristic (low molecular weight) at room temperature, the homopolymer may not be used for a binder by itself. However, the demerits of the ethylene oxide monomer may be overcome, and it may be applied to a rechargeable lithium battery by copolymerizing it with another monomer selected from methylmethacrylate, acrylonitrile, or a combination thereof to provide a copolymer. In other words, the copolymer composition has improved ion conductivity at room temperature, and electrochemical stability. Accordingly, the copolymer composition is not decomposed during battery charge and discharge reactions, so it is possible to use it for a long time.

When the first monomer is methylmethacrylate, the copolymer may include a copolymer of methylmethacrylate and ethylene oxide (MMA-EO). Since the methylmethacrylate and ethylene oxide (MMA-EO) copolymer composition has different physical phases depending upon the amount of methylmethacrylate and the amount of the lithium salt, the amount of methylmethacrylate may be suitably adjusted for a desired physical phase. The physical phases of the entire polymer composition are determined by the interaction of the amounts of the first monomer and the lithium salt. For example, when the methylmethacrylate is included at about 31 wt % to about 54 wt % based on the total weight of the copolymer with a predetermined amount range of the lithium salt, it can be a solid. The proper range of an amount for a lithium salt will be described later.

A solid phase is preferable for the entire polymer composition in that a solid has a rigid property that may function as an electrolyte and a separating layer, or a binder, and have appropriate ion conductivity as well.

When the first monomer is acrylonitrile, it may include a polymer of acrylonitrile and ethylene oxide (AN-EO). Since the obtained acrylonitrile and ethylene oxide copolymer has different physical phases, depending upon the amount of acrylonitrile and the amount of lithium salt, the amount of acrylonitrile may be suitably adjusted for a desired physical phase with a predetermined amount range of the lithium salt. The acrylonitrile may be included at about 11 to about 20 wt % based on the total weight of the copolymer with a predetermined amount range of the lithium salt. For example, the acrylonitrile may be included at about 15 wt % based on the total weight of the copolymer, but is not limited thereto. When the acrylonitrile is included within the range of about 11 to about 20 wt % based on the total weight of the copolymer with a predetermined amount range of the lithium salt, the acrylonitrile-ethylene oxide copolymer may be obtained in a form of a free standing film that provides a solid at room temperature. If the amount of acrylonitrile is lower than about 11 wt %, it is difficult to obtain a solid; on the other hand, when it is higher than about 20 wt %, it is difficult to fabricate a battery since it is not dissolved in all solvents including N-methylpyrrolidone.

The first monomer may include both methylmethacrylate and acrylonitrile. In this case, it is may provide a terpolymer (MMA-AN-EO) of methylmethacrylate, acrylonitrile, and ethylene oxide. Since the MMA-AN-EO terpolymer has different physical phases, depending upon the amount of methylmethacrylate and acrylonitrile in the entire terpolymer, the amount of methylmethacrylate and acrylonitrile may be suitably adjusted for a desired physical phase.

The total amount of methylmethacrylate and acrylonitrile may be included at about 20 wt % to about 50 wt % in the terpolymer with a predetermined amount range of the lithium salt. For example, the methylmethacrylate may be included at about 15 wt % to about 30 wt %; the acrylonitrile may be included in about 5 wt % to about 20 wt %. Within the range, the terpolymer is a solid, so it is possible for it to function as a solid electrolyte and a separating layer, or a binder, in a rechargeable lithium battery, and to have appropriate ion conductivity. Particularly, the terpolymer also has merits in improving ion conductivity by including acrylonitrile and simultaneously in providing a good mechanical property by including methylmethacrylate.

The polymer according to one embodiment may have a weight average molecular weight of about 10,000 to about 50,000 regardless of the kind of the first monomer. When the polymer has the weight average molecular weight within the range, it is possible to provide the desirable properties of elasticity and viscosity for an electrolyte or a binder for a rechargeable lithium battery.

The lithium salt in the polymer composition according to one embodiment is dissolved in an organic solvent to act as a source of lithium ions that enable operation of the rechargeable lithium battery. It is not particularly limited as long as it releases lithium ions from the electrolyte. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, LiI, or a combination thereof, and in one embodiment, $LiPF_6$, $LiBF_4$, $LiAsF_6$, $LiClO_4$, $LiN(CF_3SO_2)_2$, $LiN(C_2F_5SO_2)_2$, $CF_3SO_3Li$, or a combination thereof are desirable.

A preferable amount range for the lithium salt can be changed depending on the other conditions, such as the kinds and the amounts of the first monomer, etc. The lithium salt may be added at about 5 to about 65 wt % based on the total weight of the polymer composition, depending upon the composition of the copolymer.

When the copolymer is a methylmethacrylate and ethylene oxide copolymer, the lithium salt may be added at about 5 to about 25 wt %. The physical phase of the polymer composition is changed depending upon the amount of the methylmethacrylate and the amount of lithium salt in the polymer composition. For example, when the methylmethacrylate is included in the polymer composition at about 31 wt % or more, the physical phase of the polymer composition is changed depending upon the amount of lithium salt. For the detailed description, when the lithium salt is included at about 8 wt % or less, a liquid polymer composition may be obtained; when the lithium salt is included at about 15 wt % or more, a solid polymer composition may be obtained; and when the lithium salt is included in a range of between about 8 to about 15 wt %, a liquid-solid-mixed composition may be obtained. Accordingly, when the methylmethacrylate is included at about 31 wt % or more in the polymer composition, the lithium salt may be included at about 15 wt % or more, for example, about 15 wt % to about 25 wt % when the polymer composition is to be used for a solid electrolyte, and the lithium salt may be included at about 5 wt % to about 8 wt % when the polymer composition is to be used for the liquid binder. A person of ordinary skill in the art may appropriately adjust the amount of lithium salt along with the desired usage of the polymer composition based on the above-mentioned description.

When the copolymer is a copolymer of acrylonitrile and ethylene oxide, the lithium salt may be added at about 15 wt % to about 65 wt %. In this case, it is possible to change the physical phase of the polymer composition according to one embodiment depending upon the amount of lithium salt. For example, when the acrylonitrile amount in the acrylonitrile and ethylene oxide copolymer is about 11 wt % or less, the polymer is composition can be liquid, but the physical phase of the entire polymer composition may be changed depending upon the amount of lithium salt when the acrylonitrile amount in the acrylonitrile and ethylene oxide copolymer is about 11 wt % or more. For example, when the acrylonitrile is included at about 15 wt %, a liquid polymer composition is obtained when the lithium salt is added at about 65 wt % or more based on the entire polymer composition, and a solid film polymer composition is obtained when the lithium salt is added at about 38 wt % or less. Accordingly, a person of ordinary skill in the art may easily adjust the lithium salt amount in the polymer composition to provide a polymer composition having a desirable physical phase and room temperature ion conductivity.

When the copolymer is a terpolymer of methylmethacrylate, acrylonitrile, and ethylene oxide, the lithium salt is added at about 10 to about 50 wt %. Specifically, when the amount of methylmethacrylate and acrylonitrile in the terpolymer of methylmethacrylate, acrylonitrile, and ethylene oxide is about 20 wt % or less, the polymer composition is liquid, but the physical phase of entire polymer composition may be changed depending upon the amount of lithium ions. For example, when the amount of methylmethacrylate and acrylonitrile is about 15 wt %, a liquid polymer composition is obtained when the lithium salt amount is 50 wt % or more based on the total polymer composition, but a solid film polymer composition is obtained when the lithium salt amount is about 40 wt % or less. Accordingly, a person of ordinary skill in the art may easily change the concentration of lithium salt according to the usage of the polymer composition to ensure an excellent solid property and room temperature ion conductivity.

In addition, the polymer composition including the MMA-EO copolymer may have a mole ratio of ethylene oxide (EO) and lithium (Li) ranging from about 5:1 to about 20:1. For example, when the MMA amount of the polymer composition including MMA-EO copolymer is about 31 wt %, the mole ratio of EO:Li may be about 5:1.

The polymer composition including the AN-EO copolymer according to one embodiment may have a mole ratio of ethylene oxide (EO) and lithium (Li) ranging from about 1:1 to about 20:1. For example, when the acrylonitrile is included at about 15 wt %, it may be about 3:1. When the lithium (Li) concentration is within the range of about 1:1 to about 20:1, it is possible to provide a transparent free standing film having excellent physical properties and excellent room temperature ion conductivity as well.

The polymer composition according to one embodiment may have room temperature ion conductivity of about $1 \times 10^{-7}$ S/cm to about $1.7 \times 10^{-4}$ S/cm. The polymer composition according to one embodiment may have room temperature ion conductivity of about $3.4 \times 10^{-6}$ S/cm to about $1.66 \times 10^{-4}$ S/cm. The room temperature ion conductivity may be different within the range depending upon the kind of polymer. It ranges from about $5 \times 10^{-7}$ S/cm to about $2 \times 10^{-6}$ S/cm in a copolymer of methylmethacrylate and ethylene oxide, from about $6 \times 10^{-6}$ S/cm to about $1.7 \times 10^{-4}$ S/cm in a copolymer of acrylonitrile and ethylene oxide, and from about $1 \times 10^{-7}$ S/cm to about $1 \times 10^{-4}$ S/cm in a terpolymer of methylmethacrylate, acrylonitrile, and ethylene oxide. Since the polymer composition according to one embodiment has sufficient room temperature ion conductivity to be applied to an electrolyte, a lithium ion battery may employ the same.

According to another embodiment, a method of preparing a polymer composition for a rechargeable lithium battery includes: copolymerizing a first monomer selected from methylmethacrylate, acrylonitrile, or a combination thereof and a second monomer of ethylene oxide in accordance with a radical polymerization to provide a polymer of the first monomer and the second monomer; adding a lithium salt into the provided polymer; and drying the polymer added with the lithium salt.

The radical polymerization is free radical polymerization. For example, it may be performed by a process of polymerizing the first monomer and the second monomer in a solvent together with a radical initiator at about 50 to 70° C. for about 5 to 10 hours. Representative examples of the radical initiator may include any one of an organic peroxide or azo-based compounds, or a mixture of at least two thereof. Examples of the organic peroxide include peroxy dicarbonates such as di-(4-t-butylcyclohexyl) peroxydicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate, 1,6-bis-(t-butyl peroxycarbonyloxy)hexane, diethylene glycol-bis-(t-butyl peroxy carbonate), and the like; diacyl peroxides such as diacetyl peroxide, dibenzoyl peroxide, dilauroyl peroxide, bis-3,5,5-trimethyl hexanoyl peroxide, and the like; and peroxy esters such as perhexyl pivalate, t-butyl peroxypivalate, t-amyl peroxypivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethylhexanoate, t-amyl peroxy 2-ethyl hexanoate, t-butyl peroxy isobutyrate, t-amylperoxy 3,5,5-trimethyl hexanoyl, t-butyl peroxy 3,5,5-trimethyl hexanoate, t-butyl peroxy acetate, t-butyl peroxy benzoate, di-butylperoxy trimethyl adipate, and the like. The azo-based compound includes 2,2'-azo-bis-(isobutyronitrile), 2,2'-azo-bis-(2,4-dimethylvaleronitrile), or 1,1'-azo-bis-(cyanocyclo-hexane).

Particularly, the radical initiator may include dibenzoyl peroxide or the like, but is not limited thereto. The radical initiator may be added in an amount for bringing about the polymerization, and for example, it may be added at about 3 to about 5 parts by weight based on 100 parts by weight of the polymer.

The obtained polymer is impregnated in a lithium salt-included organic solvent. The polymer and the lithium salt-included organic solvent may be mixed in a weight ratio of about 5:95 to 15:85.

The lithium salt-included organic solvent may have a concentration of 0.3 to 0.9M. The lithium salt is not specifically limited, and the same is mentioned above.

The organic solvent may include carbonate-based, ester-based, ether-based, ketone-based, alcohol-based, or aprotic solvents. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon, a double bond, an aromatic ring, or an ether bond, and does not include an aromatic ring, amides such as dimethyl formamide, dioxolanes such as 1,3-dioxolane, sulfolanes, and so on.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of about 1:1 to about 1:9, and when the mixture is used as an electrolyte, the electrolyte performance may be enhanced.

In addition, the electrolyte according to one embodiment may further include mixtures of carbonate-based solvents and aromatic hydrocarbon-based solvents. The carbonate-based solvents and the aromatic hydrocarbon-based solvents may be mixed together in the volume ratio of about 1:1 to about 30:1.

The aromatic hydrocarbon-based organic solvent may be represented by the following Chemical Formula 1.

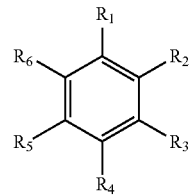

[Chemical Formula 1]

In the above Chemical Formula 1, $R_1$ to $R_6$ are independently hydrogen, a halogen, a C1 to C10 alkyl, or a C1 to C10 haloalkyl.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 2 in order to improve the cycle-life of a battery.

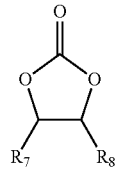

[Chemical Formula 2]

In the above Chemical Formula 2, $R_7$ and $R_8$ are the same or different, and are hydrogen, a halogen, a cyano (CN) group, a nitro ($NO_2$) group, or a C1 to C5 fluoroalkyl group, provided that at least one of $R_7$ and $R_8$ is a halogen, a nitro ($NO_2$) group, or a C1 to C5 fluoroalkyl group, and $R_7$ and $R_8$ are not simultaneously hydrogen.

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The use amount of the additive for improving cycle life may be adjusted within an appropriate range.

Conventionally, living radical polymerization has been used for polymerization. Since the living radical polymerization uses a metal ion-included initiator, the metal ion remains in the obtained polymer to cause an electrochemical side reaction. Furthermore, since the living radical polymerization requires highly advanced technology, it is not suitable for mass-production. Compared to the living radical polymerization, the method of preparing a polymer composition for a rechargeable lithium battery according to one embodiment has merits in that the process is simple, economical, and can be used for mass production since the first monomer and the second monomer are polymerized by the simple radical polymerization.

The rechargeable lithium battery according to an embodiment includes a positive electrode including a positive active material and a first binder, a negative electrode including a negative active material and a second binder, and a polymer electrolyte. At least one of the first binder, the second binder, and the polymer electrolyte includes the polymer composition according to one embodiment of this disclosure.

The positive active material includes lithiated intercalation compounds that reversibly intercalate and deintercalate lithium ions. The positive active material may include a composite oxide including at least one selected from the group consisting of cobalt, manganese, and nickel, as well as lithium, in particular, the following lithium-containing compounds may be used:

$Li_aA_{1-b}X_bD_2$ ($0.90 \leq a \leq 1.8$, $0 \leq b \leq \leq 0.5$); $Li_aE_{1-b}X_b O_{2-c}D_c$ ($0.90 \leq a \leq 1.8$, $0 \leq b \leq \leq 0.5$, $0 \leq c \leq \leq 0.05$); $LiE_{2-b}X_bD_4$ ($0 \leq b \leq \leq 0.5$); $LiE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8, 0 \leq b \leq \leq 0.5$, $0 \leq c \leq 0.05, 0<\alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq \leq 0.05$, $0<\alpha<2$); $Li_aNi_{1-b-c}CO_bX_cO_{2-\alpha}T_2$ ($0.90 \leq a \leq 1.8, 0 \leq b \leq 0.5, 0 \leq c \leq \leq 0.05, 0<\alpha<2$); $Li_aNi_{1-b-c}M-n_bX_cD_\alpha$ ($0.90 \leq a \leq 1.8$, $0 \leq b \leq \leq 0.5$, $0 \leq c \leq 0.05$, $0<\alpha \leq 2$); $Li_aNi_{1-b-c}Mn_bO_cO_{2-\alpha}T_\alpha$ ($0.90 \leq a \leq 1.8$, $0 \leq b \leq \leq 0.5$, $0 \leq 0.05$, $0<\alpha<2$); $Li_aNi_{1-b-c}Mn_bX_cO_{2-\alpha}T_2$ ($0.90 \leq a \leq 1.8$, $0 \leq b \leq \leq 0.5$, $0$ $c \leq 0.05$, $0<\alpha<2$); $Li_aNi_bE_cG_dO_2$ ($0.90 \leq a \leq 1.8$, $0 \leq b \leq \leq 0.9$, $0 \leq c \leq 0.001 \leq d \leq 0.1$); $Li_aNi_b- CO_cMn_dG_eO_2$ ($0.90 \leq a \leq 1.8$, $0 \leq b \leq \leq 0.9$, $0 \leq c \leq 0.5$, $0 \leq d \leq \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq \leq 0.1$); $Li_aMnG_bO_2$ ($0.90 \leq a \leq 1.8$, $0.001 \leq b \leq \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiZO_2$; $LiNiVO_4$; $Li^{(3-f)}J_2(PO_4)_3$ ($0 \leq f \leq 2$); $Li_{(3-f)}Fe_2(PO_4)_3$ ($0 \leq f \leq 2$); or $LiFePO_4$.

In the above formulas, A is Ni, Co, Mn, or a combination thereof; X is Al, Ni, Co, Mn, Cr, Fe, Mg, Sr, V, a rare earth element, or a combination thereof; D is O, F, S, P, or a combination thereof; E is Co, Mn, or a combination thereof; T is F, S, P, or a combination thereof; C is Al, Cr, Mn, Fe, Mg, La, Ce, Sr, V, or a combination thereof; 0 is Ti, Mo, Mn, or a combination thereof; Z is Cr, V, Fe, Sc, Y, or a combination thereof; and J is V, Cr, Mn, Co, Ni, Cu, or a combination thereof.

The compound may have a coating layer on the surface, or may be mixed with another compound having a coating layer. The coating layer may include at least one coating element. The coating element for a coating layer may include Mg, Al, Co, K, Na, Ca, Si, Ti, V, Sn, Ge, Ga, B, As, Zr, or a mixture thereof. The coating element may be in the form of an oxide, a hydroxide, an oxyhydroxide, an oxycarbonate, or a hydroxyl carbonate. The compound for a coating layer may be amorphous or crystalline. The coating layer may be formed in a method having no adverse influence on properties of a positive active material by including these elements in the compound. For example, the method may include any coating method such as spray coating, dipping, and the like, but is not illustrated in more detail, since it is well-known to those who work in the related field.

For the first binder, the polymer composition according to one embodiment may be used. The polymer composition includes a polymer of a first monomer selected from methylmethacrylate, acrylonitrile, or a combination thereof, and a second monomer of ethylene oxide, as well as a lithium salt. Generally-used binders such as polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and the like may also be used for the first binder.

The positive electrode may include a conductive material. The conductive material is included to improve electrode conductivity. Any electrically conductive material may be used as a conductive material unless it causes a chemical change. Examples of the conductive material include one or more of natural graphite, artificial graphite, carbon black, acetylene black, ketjen black, carbon fiber, a metal powder or a metal fiber including copper, nickel, aluminum, silver, and the like, or the conductive material may be used along with a polyphenylene derivative.

The negative active material includes a material that reversibly intercalates/deintercalates lithium ions, a lithium metal, a lithium metal alloy, a material being capable of doping lithium, or a transition metal oxide.

The material that reversibly intercalates/deintercalates lithium ions includes carbon materials. The carbon materials may be any generally-used carbon-based negative active material for a lithium ion rechargeable battery. Examples of the carbon material include crystalline carbon, amorphous carbon, and a mixture thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and the like.

Examples of the lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ ($0<x<2$), a Si-Q alloy (where 0 is an element selected from an alkali metal, an alkaline-earth metal, a group 13 element, a group 14 element, a transition element, a rare earth element, or a combination thereof, and is not Si), Sn, $SnO_2$, a Sn—R alloy (R is an element selected from an alkali metal, an alkaline-earth metal, a group 13 element, a group 14 element, a transition element, a rare earth element, or a combination thereof, and is not Sn), and mixtures thereof. At least one of these materials may be mixed with $SiO_2$. The elements Q and R are the same or different, and are independently Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like.

The second binder may include the polymer composition according to one embodiment of this disclosure. It also includes a binder generally used in this field as in the positive electrode.

The negative electrode may further include a conductive material.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like, metal-based materials including a metal powder or a metal fiber of copper, nickel, aluminum, silver, and the like, conductive polymers of polyphenylene derivatives, or mixtures thereof.

The positive and negative electrodes may be fabricated by a method including mixing an active material, a conductive material, and a binder to provide an active material composition, and coating the composition on a current collector. The electrode manufacturing method is well known, and thus is not described in detail in the present specification. The solvent may be N-methylpyrrolidone, but is not limited thereto. The current collector for a positive electrode may be made of Al, but is not limited thereto. The current collector for a negative electrode may be selected from a copper foil, a nickel foil, a stainless steel foil, a titanium foil, a nickel foam, a copper foam, a polymer substrate coated with a conductive metal, or a combination thereof.

The electrolyte may be the polymer composition according to one embodiment of this disclosure. The polymer composition has excellent ion conductivity, so it is possible to use it as a polymer electrolyte without adding an additional organic solvent.

The polymer composition may be used for at least one of a negative electrode binder, a positive electrode binder, and an electrolyte. In other words, the polymer composition is generally a solid at room temperature, but it has excellent solubility to a solvent for preparing the active material composition, particularly to N-methylpyrrolidone (NMP), so it is possible to use it as an active material binder for a rechargeable lithium battery. In addition, it is possible to use the film obtained from the polymer composition as a solid electrolyte. In this case, the polymer composition may maintain the electrochemical stability at a high voltage of around 5.5V, so it may be applied to both a solid electrolyte and a binder for a rechargeable lithium battery.

As described above, when the solid electrolyte and the binder in the solid electrolyte battery are formed from the same material, it brings merits in that the interface resistance of lithium ions is remarkably decreased compared to the case that the solid electrolyte is formed from the different material from the binder. Specifically, the liquid electrolyte system ensures the ion transporting channel by penetrating the electrolyte solution into the active material, but the solid electrolyte system does not ensure this ion transporting channel. Particularly, in the generally-used solid electrolyte battery, even though the electrolyte has excellent ion conductivity to the lithium ions, it significantly resists transporting lithium ions between active materials bound by a PVDF-based binder. Accordingly, if it is designed to form the electrolyte and the binder in the solid electrolyte battery with the same material, it is possible to provide a channel that is capable of quickly transporting ions between active materials as well as ion conductivity in the electrolyte. Resultantly, it is possible to decrease the interface resistance between the active material layer and the solid electrolyte layer by providing both the binder of the active material layer and the solid electrolyte with the same material.

When the polymer composition is used for a solid electrolyte, the solid electrolyte is positioned between the positive electrode and the negative electrode and acts as a separator separating the positive electrode and the negative electrode, and the additional separator is not required.

FIG. 1 is a schematic view of a representative structure of a rechargeable lithium battery. FIG. 1 illustrates a rechargeable lithium battery 100, which includes a negative electrode 112, a positive electrode 114, a polymer electrolyte 113 interposed between the negative electrode 112 and the positive electrode 114, a battery case 120, and a sealing member 140 sealing the battery case 120. FIG. 1 shows a cylindrical rechargeable lithium battery, but it may be prismatic or pouch-shaped battery.

The following examples illustrate this disclosure in more detail. These examples, however, are not in any sense to be interpreted as limiting the scope of this disclosure.

EXAMPLE 1

10 g of methylmethacrylate and 10 g of ethylene oxide were added to 50 g of toluene, and a radical polymerization initiator of benzoyl peroxide (BPO) was added and reacted at 65° C. for 9 hours to provide a copolymer of methylmethacrylate and ethylene oxide. The copolymer of methylmethacrylate and ethylene oxide had a weight average molecular weight of 29,000.

Then the copolymer was added into a solution in which $LiClO_4$ lithium salt was dissolved in a mixed solvent of tetrahydrofuran and acetonitrile (44:66 volume ratio) to provide a mole ratio of ethylene oxide (EO) and lithium (Li) of 20:1, as shown in Table 1.

The mixture was vacuum dried at 80° C. for 72 hours to provide a polymer composition for a rechargeable lithium battery.

EXAMPLE 2

A polymer composition for a rechargeable lithium battery was prepared in accordance with the same procedure as in Example 1, except that the mole ratio of ethylene oxide (EC) and lithium (Li) was 10 to 1. The copolymer of methylmethacrylate and ethylene oxide had a weight average molecular weight of 29,000.

EXAMPLE 3

A polymer composition for a rechargeable lithium battery was prepared in accordance with the same procedure as in Example 1, except that the mole ratio of ethylene Oxide (EO) and lithium (Li) was 5 to 1. The copolymer of methylmethacrylate and ethylene oxide had a weight average molecular weight of 29,000.

EXAMPLE 4

A polymer composition for a rechargeable lithium battery was prepared in accordance with the same procedure as in Example 1, except that 7.5 g of methylmethacrylate and 12.5 g of ethylene oxide were used instead of 10 g of methylmethacrylate and 10 g of ethylene oxide, and the mole ratio of ethylene oxide (EO) and lithium (Li) was 18 to 1. The copolymer of methylmethacrylate and ethylene oxide had a weight average molecular weight of 25,000.

EXAMPLE 5

A polymer composition for a rechargeable lithium battery was prepared in accordance with the same procedure as in Example 4, except that the mole ratio of ethylene oxide (EO) and lithium (Li) was 9 to 1. The copolymer of methylmethacrylate and ethylene oxide had a weight average molecular weight of 25,000.

EXAMPLE 6

A polymer composition for a rechargeable lithium battery was prepared in accordance with the same procedure as in Example 4, except that the mole ratio of ethylene oxide (EO) and lithium (Li) was 5 to 1. The copolymer of methylmethacrylate and ethylene oxide had a weight average molecular weight of 25,000.

EXAMPLE 7

A polymer composition for a rechargeable lithium battery was prepared in accordance with the same procedure as in Example 1, except that 5 g of methylmethacrylate and 15 g of ethylene oxide were used instead of 10 g of methylmethacrylate and 10 g of ethylene oxide, the mole ratio of ethylene oxide (EO) and lithium (Li) was 9 to 1. The copolymer of methylmethacrylate and ethylene oxide had a weight average molecular weight of 18,000.

EXAMPLE 8

A polymer composition for a rechargeable lithium battery was prepared in accordance with the same procedure as in Example 7, except that the mole ratio of ethylene oxide (EO) and lithium (Li) was 5 to 1. The copolymer of methylmethacrylate and ethylene oxide had a weight average molecular weight of 18,000.

The composition ratio of methylmethacrylate (MMA) and the mole ratio of ethylene oxide (EO) and lithium (Li) are shown in the following Table 1, and the abbreviation PEO stands for polyethylene oxide.

TABLE 1

| | Composition (wt %) (NMR) | | $M_W$ | EO:Li Mole ratio after $LiClO_4$ | Physical phase at |
|---|---|---|---|---|---|
| | PEO | MMA | $(GPC)^a$ | addition | 25° C. |
| Example 1 | 46 | 54 | 29,000 | 20:1 | solid |
| Example 2 | 46 | 54 | 29,000 | 10:1 | solid |
| Example 3 | 46 | 54 | 29,000 | 5:1 | solid |
| Example 4 | 58 | 42 | 25,000 | 18:1 | solid |
| Example 5 | 58 | 42 | 25,000 | 9:1 | solid |
| Example 6 | 58 | 42 | 25,000 | 5:1 | solid |
| Example 7 | 69 | 31 | 18,000 | 9:1 | solid |
| Example 8 | 69 | 31 | 18,000 | 5:1 | solid |

* $(GPC)^a$: reference sample: polystyrene, solvent: tetrahydrofuran, temperature: 40° C.

EXAMPLE 9

A polymer composition for a rechargeable lithium battery was prepared in accordance with the same procedure as in Example 1, except that 7.5 g of acrylonitrile and 12.5 g of ethylene oxide were used instead of 10 g of methylmethacrylate and 10 g of ethylene oxide, and the mole ratio of ethylene oxide (EO) and lithium (Li) was 6 to 1. The copolymer of acrylonitrile and ethylene oxide had a weight average molecular weight of 12,000.

EXAMPLE 10

A polymer composition for a rechargeable lithium battery was prepared in accordance with the same procedure as in Example 1, except that the mole ratio of ethylene oxide (EO) and lithium (Li) was 3 to 1. The copolymer of acrylonitrile and ethylene oxide had a weight average molecular weight of 12,000.

COMPARATIVE EXAMPLE 1

A polymer composition for a rechargeable lithium battery was prepared in accordance with the same procedure as in Example 1, except that only 10 g of ethylene oxide was used, and the mole ratio of ethylene oxide (EC) and lithium (Li) was 7 to 1. The polyethylene oxide (PEO) had a weight average molecular weight of 45,000. The polyethylene oxide had a physical phase of a liquid at room temperature.

COMPARATIVE EXAMPLE 2

1M of lithium salt of LiTFSI (lithium bistrifluoro methane sulfonamide) was dissolved in a mixed solvent (3:7 volume ratio) of ethylene carbonate and diethyl carbonate to provide a liquid electrolyte.

The composition of copolymers obtained from Examples 10 to 16 and Comparative Example 1 and the mole ratio of ethylene oxide (EO) and lithium (Li) are shown in the following Table 2.

TABLE 2

| | Composition (wt %) (NMR) | | MW | EO:Li Mole ratio after $LiClO_4$ | Physical phase at |
|---|---|---|---|---|---|
| | PEO | AN | $(GPC)^a$ | addition | 25° C. |
| Example 9 | (62) 85 | (38) 15 | 12,000 | 6:1 | hard film |
| Example 10 | (62) 85 | (38) 15 | 12,000 | 3:1 | soft film |
| Comparative Example 1 | 100 | 0 | 45,000 | 7:1 | liquid |

$(GPC)^a$: reference sample: polystyrene, solvent: tetrahydrofuran, temperature: 40° C.

The number inside the parenthesis indicates an initial monomer ratio before polymerization reaction.

Measurement of Oxidation Potential (Linear Sweep Voltammetry)

The polymer compositions obtained from Example 10 and Comparative Example 2 were measured for oxidation potential in accordance with the following method. Using a working electrode of stainless steel and a reference electrode and a counter electrode of lithium metal, it was measured at a scan speed of 1 mV/sec and a 25° C. condition in accordance with a linear sweep voltammetry, and the results are shown in FIG. 2 and FIG. 3.

Figure 2:
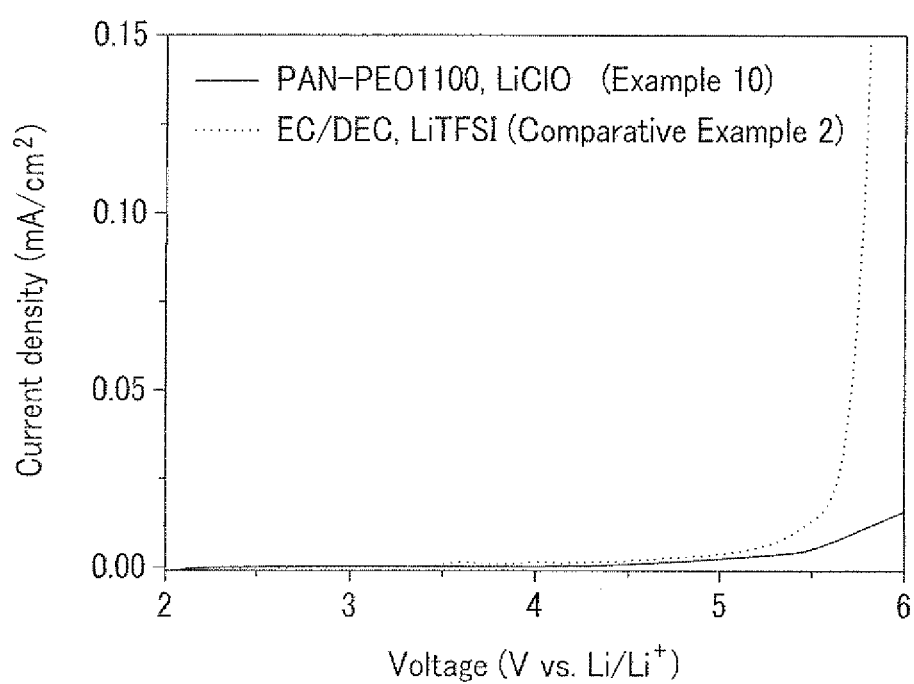
FIG. 2 is a graph showing electrochemical stability results of oxidation potential of the rechargeable lithium battery including a polymer composition including an acrylonitrile (AN)-ethylene oxide (EO) copolymer obtained from Example 10 and the rechargeable lithium battery obtained from Comparative Example 2.

As shown in FIG. 2, it is confirmed that the polymer composition obtained from Example 10 did not rapidly decompose at a voltage of about 5.5V or more, so it had excellent electrochemical stability that was superior to the liquid electrolyte according to Comparative Example 2 that was rapidly decomposed at about 5.5V.

Figure 3:
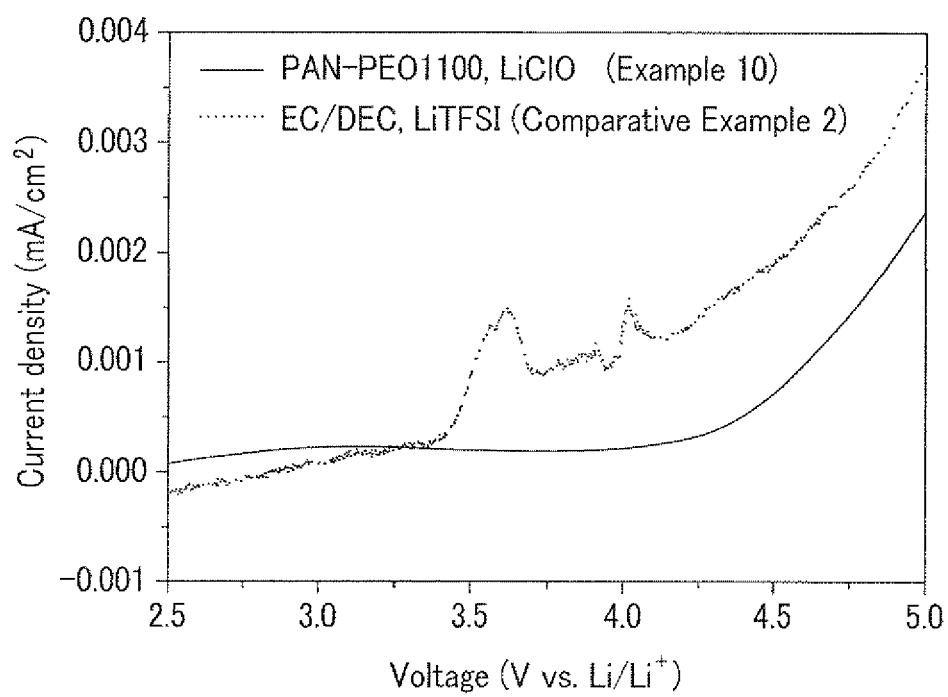
FIG. 3 is an enlarged view showing the oxidation potential results of FIG. 2 showing the electrochemical stability of the rechargeable lithium battery.

FIG. 3 is an enlarged view of the oxidation potential results of FIG. 2. The black solid line represents the polymer composition obtained from Example 10, and the red dotted line represents the liquid electrolyte solution obtained from Comparative Example 2. It is understood that the liquid electrolyte solution according to Comparative Example 2 began to be decomposed at 3.5V, but the polymer electrolyte according to Example 10 suppressed the decomposition reaction.

Measurement of Ion Conductivity and Electrochemical Stability

The polymer compositions obtained from examples and comparative examples were measured for room temperature ion conductivity and electrochemical stability. The results are shown in the following Table 3.

TABLE 3

|  |  | Room temperature ion conductivity (S/cm, 25° C.) | Stability (V) | Phase |
|---|---|---|---|---|
| Copolymer of methylmethacrylate and ethylene oxide | Example 5 | $8.38 \times 10^{-7}$ | 5.9 | solid |
|  | Example 6 | $1.99 \times 10^{-6}$ | 5.9 | solid |
|  | Example 7 | $1.20 \times 10^{-6}$ | 5.8 | solid |
|  | Example 8 | $3.40 \times 10^{-6}$ | 5.5 | solid |
| Copolymer of acrylonitrile and ethylene oxide | Example 9 | $1.66 \times 10^{-5}$ | 5.5 | solid |
|  | Example 10 | $1.66 \times 10^{-4}$ | 5.5 | solid |
| Polyethylene oxide | Comparative Example 1 | $6.24 \times 10^{-6}$ | 5.8 | liquid |

Referring to Table 3, the polymer compositions obtained from the examples ensured a physical phase of a solid at room temperature and excellent ion conductivity and electrochemical stability similar to or more than liquid polyethylene oxide obtained from Comparative Example 1. On the other hand, when the polyethylene oxide was formed from a crystalline solid, the room temperature on conductivity was significantly decreased to a level of about $1 \times 10^{-8}$ S/cm. Accordingly, the polymer compositions obtained from the examples had a physical phase of a solid and also showed excellent room temperature ion conductivity that was comparable to the liquid polyethylene oxide, so it may have excellent physical properties as a solid electrolyte for a rechargeable lithium battery.

Figure 4:
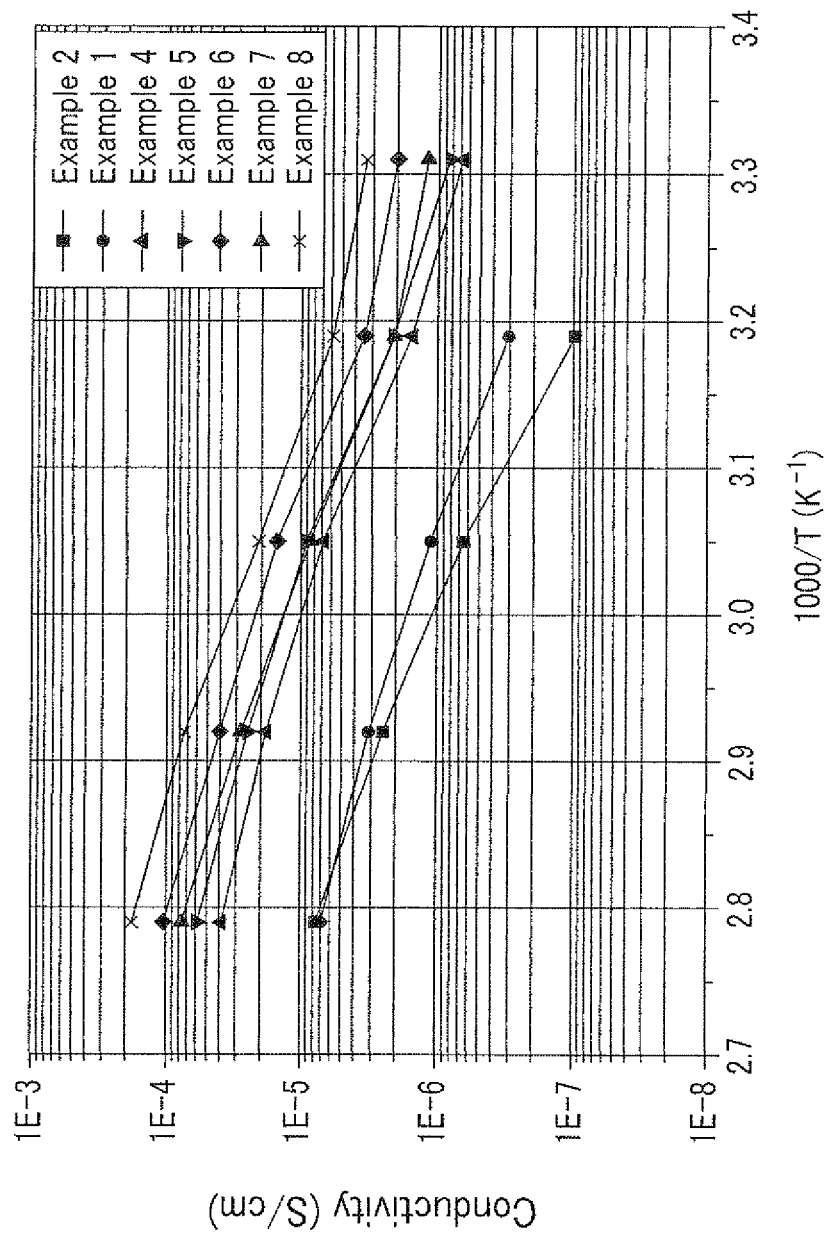
FIG. 4 is a graph showing room temperature ion conductivity of a polymer composition including each methylmethacrylate (MMA)-ethylene oxide (EO) copolymer obtained from Examples 1, 2 and 4-8.
Figure 5:
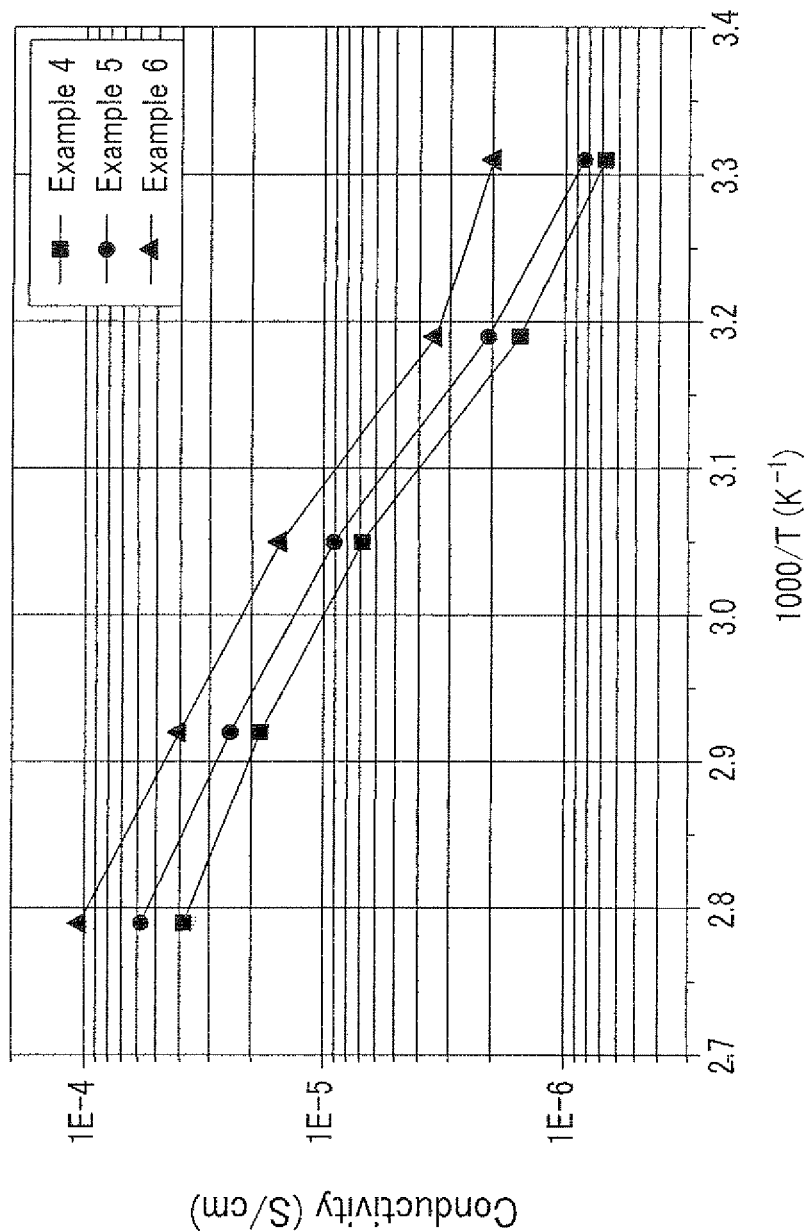
FIG. 5 a graph showing room temperature ion conductivity of a polymer composition including each methylmethacrylate (MMA)-ethylene oxide (EO) copolymer obtained from Examples 4-6, depending upon the amount of lithium salt.
Figure 6:
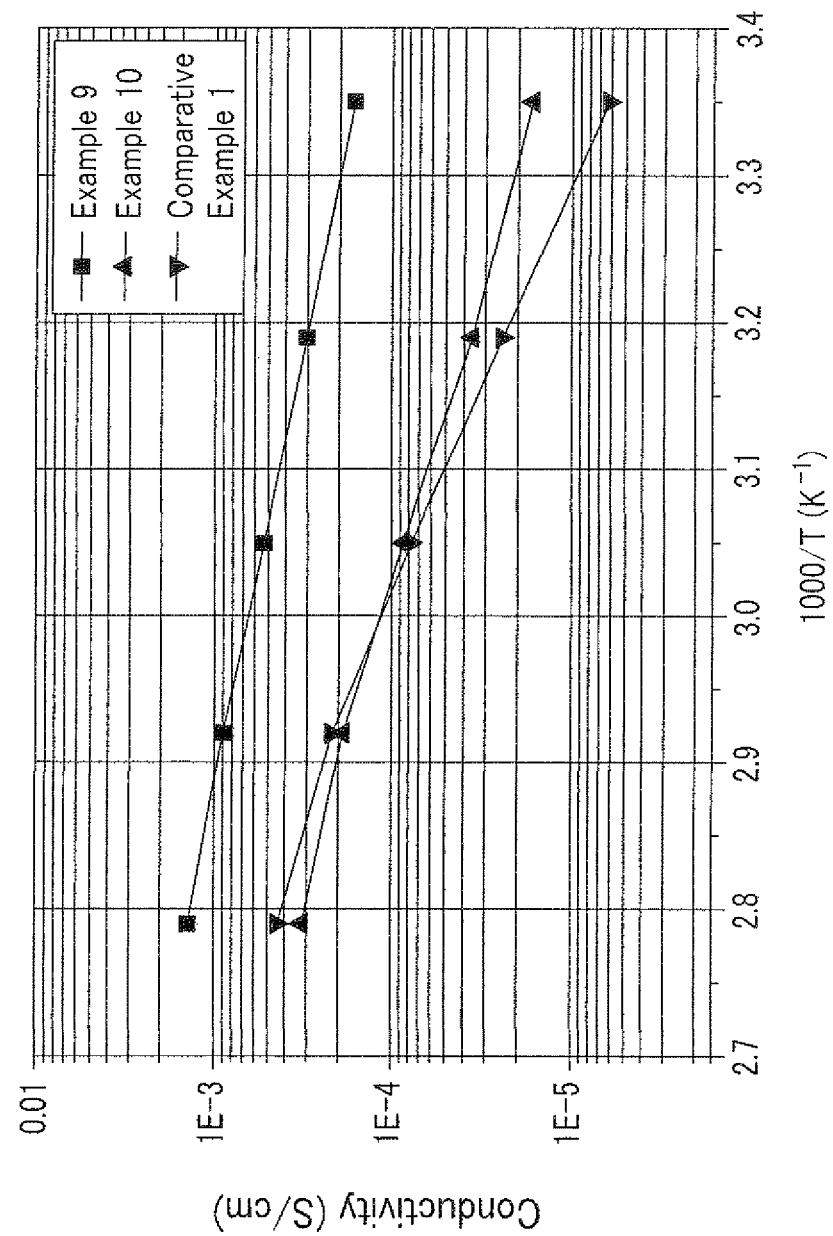
FIG. 6 is a graph showing room temperature ion conductivity of a polymer composition including each acrylonitrile (AN)-ethylene oxide (EO) copolymer obtained from Examples 9 and 10, and a polymer obtained from Comparative Example 1.

FIG. 4 to FIG. 6 are graphs showing room temperature ion conductivity of the polymer compositions obtained from the examples and the liquid polyethylene oxide obtained from Comparative Example 1.

FIG. 4 and FIG. 5 are graphs showing room temperature ion conductivity of the solid polymer compositions including the methylmethacrylate-ethylene oxide copolymer (MMA-EO) obtained from the examples.

From FIG. 5, it is understood that the room temperature ion conductivity of the solid polymer composition including the methylmethacrylate-ethylene oxide copolymer (MMA-EO) is changed, depending upon the amount of lithium ion salt.

FIG. 6 is a graph showing room temperature ion conductivity of the solid polymer composition including the acrylonitrile-ethylene oxide copolymer (AN-EO) obtained from the examples.

Figure 7:
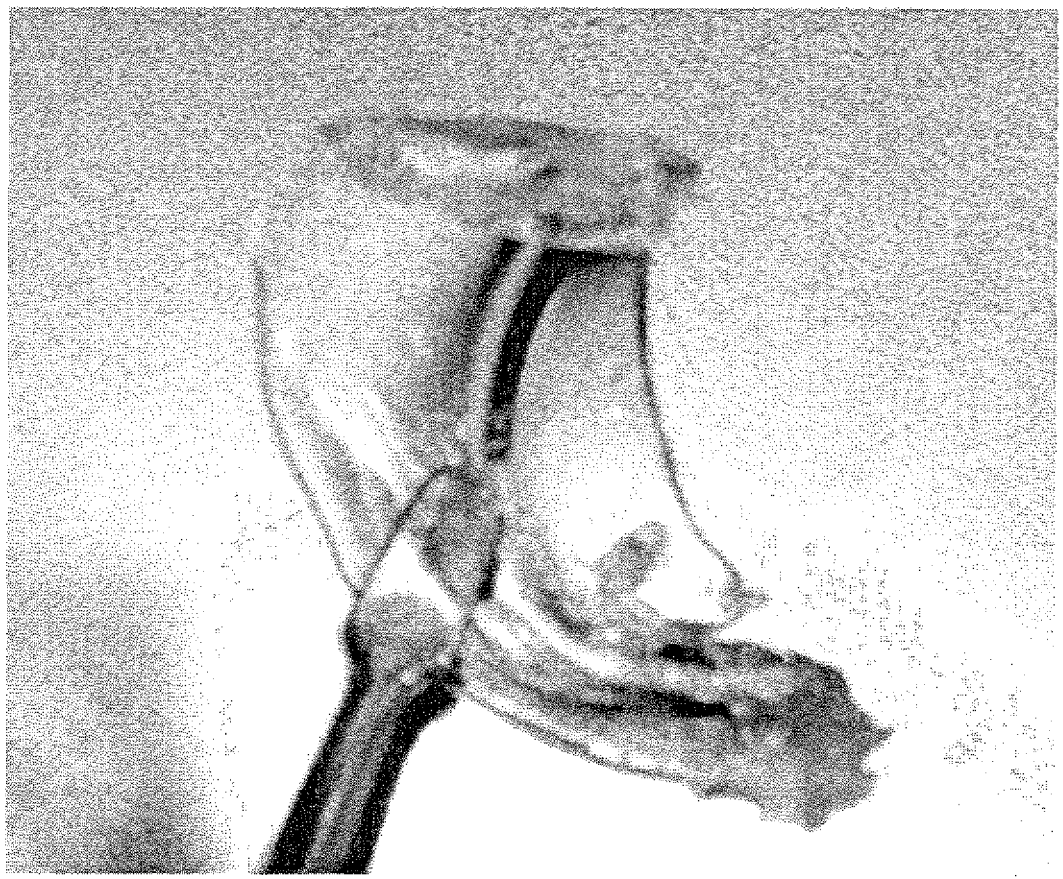
FIG. 7 is a photograph showing that the polymer composition including an acrylonitrile (AN)-ethylene oxide (EO) copolymer maintains a stable shape without running down at room temperature.

FIG. 7 is a photograph showing that the solid polymer composition including the acrylonitrile-ethylene oxide copolymer (AN-EO) obtained from Example 10 stably maintained the shape and did not run down at room temperature.

Measurement of Solubility

The polymer composition obtained from Example 10 was measured for solubility to various kinds of solvents before and after the heating treatment, and the results are shown in the following Table 4.

TABLE 4

|  | N-methyl pyrrolidone | Tetrahydrofuran (THF) | Ethylene carbonate/diethyl carbonate | Methanol |
|---|---|---|---|---|
| Before heat treatment | Dissolved | Non-dissolved | Decomposed into small pieces | Non-dissolved |
| After heat treatment at 80° C. | Dissolved | Non-dissolved | Decomposed into small pieces | Non-dissolved |

In the Table 4, THF is the generally-used solvent for dissolving a lipophilic polymer, methanol is the generally-used solvent for dissolving a hydrophilic polymer, EC/DEC is the generally-used solvent for an electrolyte solution, and N-methyl pyrrolidone (NMP) was the generally-used solvent for dissolving the binder. As shown in Table 4, it is confirmed that the polymer composition obtained from Example 10 had excellent solubility to N-methylpyrrolidone (NMP). From the results, it is understood that the polymer composition according to Example 10 was insoluble in the electrolyte and soluble in NMP used for manufacturing the electrode of the battery, and was appropriate for a binder for a rechargeable lithium battery.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
   a positive electrode comprising a positive active material and a first binder;
   a negative electrode comprising a negative active material and a second binder; and
   a polymer electrolyte,
   at least one of the first binder, the second binder, and the polymer electrolyte comprising a polymer composition comprising:
      a polymer of a first monomer selected from methylmethacrylate (MMA) having no aromatic group, acrylonitrile (AN) having no aromatic group, or a combination thereof, and a second monomer of ethylene oxide (EO), the polymer being a statistical copolymer or an alternating copolymer; and
      a lithium salt,
      the polymer composition being soluble in N-methylpyrrolidone, the polymer composition being separately insoluble in each of methanol and tetrahydrofuran.

2. The rechargeable lithium battery of claim 1, the polymer comprising a methylmethacrylate-ethylene oxide (MMA-EO) copolymer including about 31 wt % to about 54 wt % of methylmethacrylate based on the total weight of the copolymer.

3. The rechargeable lithium battery of claim 1, the polymer comprising an acrylonitrile-ethylene oxide (AN-EO) copolymer including about 11 wt % to about 20 wt % of acrylonitrile based on the total weight of the copolymer.

4. The rechargeable lithium battery of claim 1, the polymer composition having a mole ratio of ethylene oxide (EO) and lithium (Li) ranging from about 1:1 to about 20:1.

5. The rechargeable lithium battery of claim 1, the polymer composition having a mole ratio of ethylene oxide (EO) and lithium (Li) ranging from about 3:1 to about 6:1.

6. The rechargeable lithium battery of claim 1, the polymer composition having room temperature ion conductivity ranging from about $1 \times 10^{-7}$ S/cm to about $1.7 \times 10^{-4}$ S/cm.

7. The rechargeable lithium battery of claim 1, at least one of the first binder and the second binder comprising the polymer composition.

8. The rechargeable lithium battery of claim 1, the polymer electrolyte comprising the polymer composition.

9. A rechargeable lithium battery comprising:
   a positive electrode comprising a positive active material and a first binder;
   a negative electrode comprising a negative active material and a second binder; and
   a polymer electrolyte, at least one of the first binder, the second binder, and the polymer electrolyte comprising a polymer composition comprising:
- a polymer of a first monomer selected from methylmethacrylate (MMA), acrylonitrile (AN) or a combination thereof, and a second monomer of ethylene oxide (EO), the polymer being a dipolymer and a statistical copolymer or an alternating copolymer; and
- a lithium salt.

10. A rechargeable lithium battery comprising:
a positive electrode comprising a positive active material and a first binder;
a negative electrode comprising a negative active material and a second binder; and
a polymer electrolyte,
wherein at least one of the first binder, the second binder, and the polymer electrolyte comprises a polymer composition comprised of a lithium salt and a polymer, the polymer comprising:
- an acrylonitrile-ethylene oxide (AN-EO) copolymer including about 11 wt % to about 20 wt % of acrylonitrile based on the total weight of the copolymer; or
- a terpolymer comprised of methylmethacrylate-acrylonitrile-ethylene oxide, and the total amount of the methylmethacrylate and the acrylonitrile is about 20 to about 50 wt % of the methylmethacrylate and acrylonitrile based on the total weight of the terpolymer.

* * * * *